Patented Apr. 25, 1933

1,905,060

UNITED STATES PATENT OFFICE

HAROLD J. ROSE, OF PENN TOWNSHIP, ALLEGHENY COUNTY, PENNSYLVANIA, AND WILLIAM H. HILL, OF NEW YORK, N. Y., ASSIGNORS TO THE KOPPERS COMPANY OF DELAWARE, A CORPORATION OF DELAWARE

PROCESS OF TREATING COAL WITH OIL

No Drawing.   Application filed April 12, 1929. Serial No. 354,694.

This invention relates to a process for treating tars and oils, and more particularly to a process for increasing the solvent properties of tars and oils with respect to coal.

It has been pointed out in our copending application, Serial No. 97,467 filed March 25, 1926, that coal is soluble in only a restricted group of materials. It is stated substantially that water-gas tar for instance may be improved for this purpose by distilling off undesirable compounds. This is true of low-temperature tar also, but the procedure is not always applicable from an economic standpoint.

It has been found that oils such as coke oven tar oils and cracked petroleum oils may be rendered more effective and in general, tars and oils may be improved for the dissolving of coal by treating them with a dehydrogenating agent such as sulphur or oxygen, or a combination of these. The process is preferably carried on at elevated temperatures, with or without the use of catalysts. At lower temperatures, the period of treatment is relatively longer than at higher temperatures.

In this process, a condensation and/or polymerization of the oils takes place. It has been found that such condensation or polymerization produces products which have an increased solvent action on coal.

During the reaction of the oily materials mentioned above, with sulphur, a considerable quantity of hydrogen sulphide is given off. From this gas, sulphur may be recovered by well known methods, such as by burning with a restricted air supply, or by liquid purification processes. Sulphur obtained from this source is just as effective as sulphur from other sources.

It has been found that only very small quantities of sulphur remain in the materials after treatment, usually not more than 10% to 15% of the amount introduced into the reaction. In other words, the sulphur treatment does not introduce an objectionable amount of sulphur into the final product. If desired, this small amount of sulphur may be reduced or removed by various treatments. For instance, the sulphur treated material may be heated in an autoclave to temperatures above the temperatures ordinarily used in the process of this invention.

In carrying out the process of this invention, good results are obtained by the additions of condensation aids, which have the effect of increasing the speed of the reaction and also of removing sulphur. Such aids are either used during the reaction, or the sulphur treated materials are boiled with the condensation aid under reflux. Compounds such as zinc chloride, aluminum chloride, potassium hydroxide and metal oxides may be used for this purpose.

As pointed out above, oxygen may be substituted for sulphur to produce the desired effect on tars and oils. Furthermore, the oily material may be treated with sulphur in the presence of oxygen. Various proportions of sulphur may be used, but it is preferable to use a little more than a trace of sulphur. The sulphur may be added to the oil or tar and the reaction brought about or completed by introducing oxygen or air. In this reaction, apparently the sulphur reacts first, then the hydrogen sulphide which is formed during the reaction is oxidized by the air or oxygen, and the sulphur thus formed enters into the reaction again. While the action of oxygen alone is somewhat slow, it may thus be speeded up by using the sulphur as a reaction carrier. In this way, a very small amount of sulphur is sufficient for the reaction, and this has its advantages in cases where the presence of sulphur is objectionable in the final product.

Another alternative would be to introduce sulphur dioxide into the reaction vessel where it would combine with the hydrogen sulphide evolved, thus forming sulphur which would enter the reaction again. The sulphur dioxide may be obtained by burning hydrogen sulphide from another reaction vessel.

The condensation or polymerization of tars and oils, as outlined above, may be carried on in the presence of coal, whereupon the coal will pass into solution while the reaction proceeds. Dehydrogenating agents appear to exert a beneficial effect on the coal as well as on the solvents.

Examples of processes of this invention are as follows:

1. One hundred parts of crude water-gas tar or low-temperature carbonization tar are heated under reflux with 10 parts of sulphur until boiling takes place. After most of the hydrogen sulphide has escaped through the condenser, the temperature is raised so that the liquid boils fairly vigorously. Under ordinary circumstances, the reaction is practically completed in a few hours. The reaction product may then be used for dissolving coal.

2. Eighty parts of crude water-gas tar or low-temperature carbonization tar are heated with 8 parts of sulphur and 20 parts of coal in a rotating autoclave. The temperature is gradually increased to 320° C., and the material kept at this temperature until the pressure has substantially ceased to increase. The autoclave is then allowed to cool down below 200° C., after which the hydrogen sulphide is allowed to escape and the coal solution is discharged.

3. Water-gas tar or other tars or oils and ten percent by weight of sulphur are mixed together and boiled vigorously under a reflux condenser for about six hours or until hydrogen sulphide has ceased to come off. Then about twenty percent by weight of freshly fused and crushed zinc chloride is added whereupon the mixture is boiled under a reflux condenser for about nine hours or until no more hydrogen sulphide comes off. The resulting tar or oil product is allowed to cool and is separated from the zinc chloride.

Water-gas tar treated in accordance with the process set forth in Example 3, will contain less sulphur than the original water-gas tar. The color of the tar is improved by the treatment with zinc chloride, the tar is less viscous than tar treated with sulphur alone, and it is a better solvent for coal than the original tar.

Coal solutions made from tars or oils treated according to the process of this invention have, of course different characteristics from those made from the same tars by topping and subsequent dissolving of coal in the distillation residue. Coal solutions made from treated oily materials are generally not as hard, although their melting point may be quite as high; and their temperature susceptibility factor is lower.

We claim as our invention:

1. A process comprising heating a mixture of water-gas tar and about 10 per cent of sulphur in the presence of coal up to about 320° C. under pressure, gradually reducing the temperature below 200° C., and then reducing the pressure.

2. A process comprising heating 80 parts by weight of water-gas tar and 8 parts by weight of sulphur in the presence of 20 parts by weight of coal up to about 320° C. under pressure, gradually reducing the temperature below 200° C., and then reducing the pressure.

In testimony whereof, we have hereunto subscribed our names this 8th day of April, 1929.

HAROLD J. ROSE.
WILLIAM H. HILL.